Figure 1:
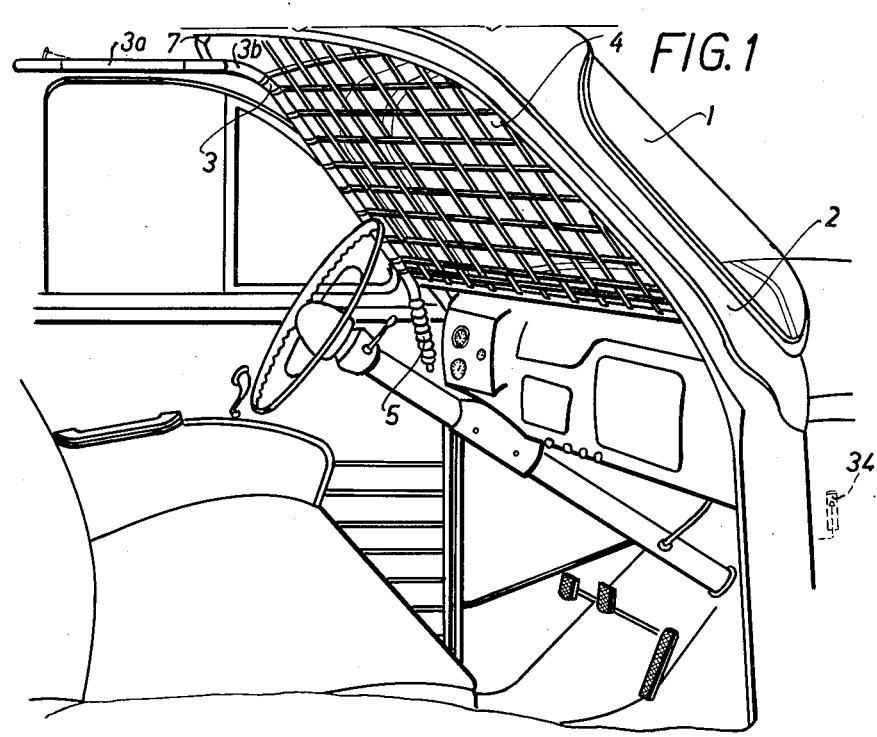

June 5, 1962    A. PRAHA    3,037,809
VEHICLE COMPRISING A PROTECTIVE DEVICE FOR THE OCCUPANTS
Filed Feb. 17, 1959    3 Sheets-Sheet 1

INVENTOR
ANTON PRAHA
BY Kurt Kelman
HIS AGENT

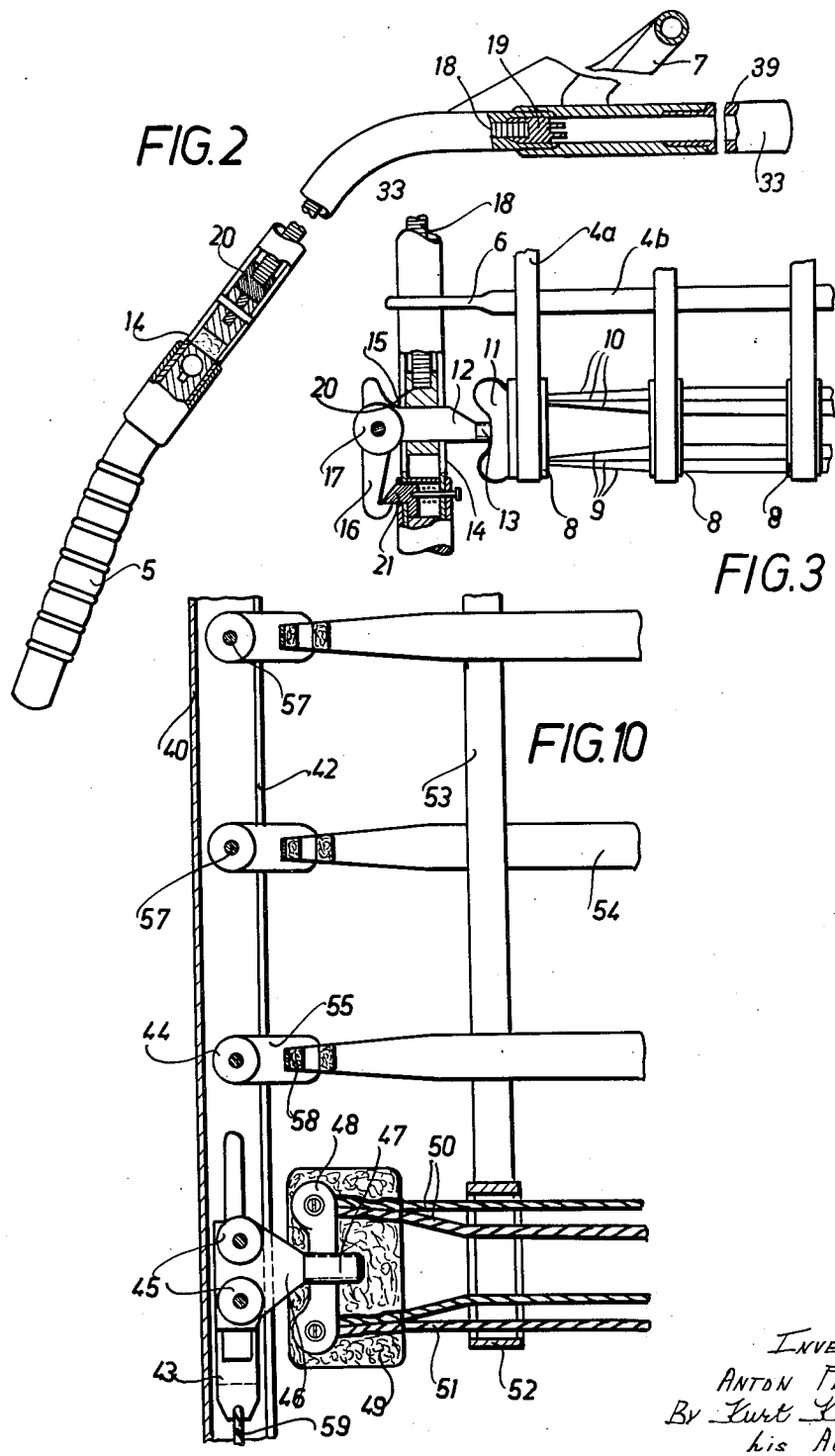

June 5, 1962  A. PRAHA  3,037,809
VEHICLE COMPRISING A PROTECTIVE DEVICE FOR THE OCCUPANTS
Filed Feb. 17, 1959  3 Sheets-Sheet 3
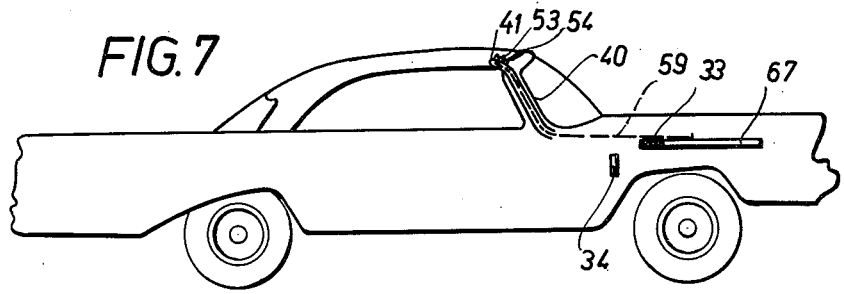
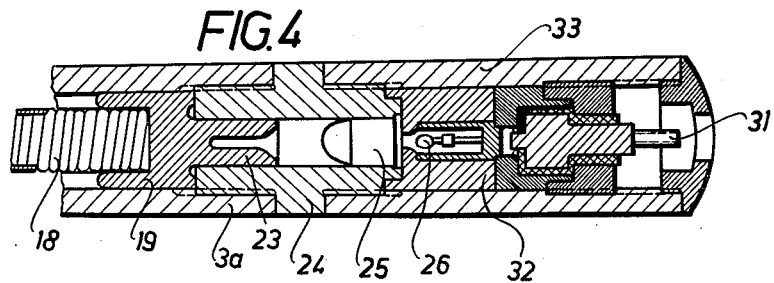
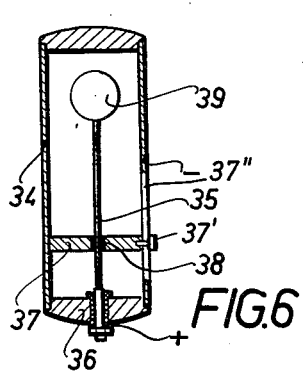
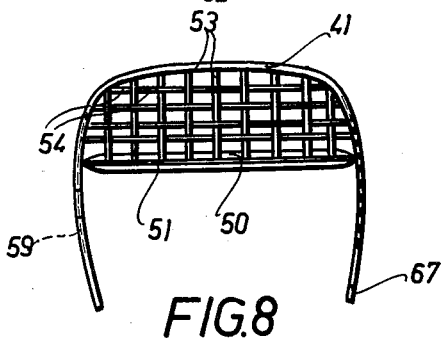
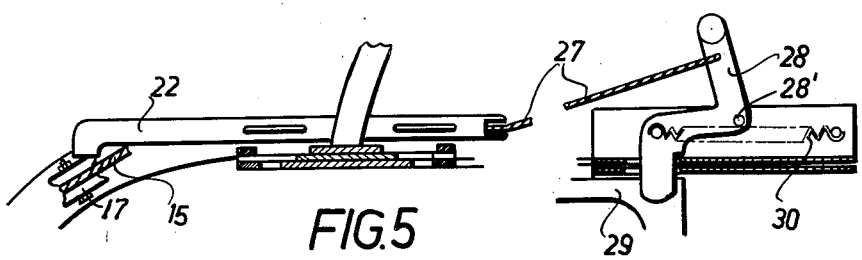
INVENTOR
ANTON PRAHA
BY Kurt Kelman
his AGENT

United States Patent Office 3,037,809
Patented June 5, 1962

3,037,809
VEHICLE COMPRISING A PROTECTIVE DEVICE FOR THE OCCUPANTS
Anton Praha, Museumstrasse 31, Linz, Austria
Filed Feb. 17, 1959, Ser. No. 793,752
Claims priority, application Austria Feb. 20, 1958
14 Claims. (Cl. 296—84)

This invention relates to a protective device in vehicles, particularly passenger cars for preventing injury to the occupants of the vehicle in the case of a sudden speed change of the vehicle, as may occur, e.g., in the case of collisions or too sudden braking. It is a special object of the invention to provide effective protection for the driver and the passenger sitting beside the driver in a passenger car and to prevent these occupants of the car from hitting hard parts such as the windshield, the dashboard etc. Another object of the invention is a protective device that will not impair visibility nor reduce the freedom of movement of the occurrants of the car even in the protecting position of the device.

The invention is essentially based on the consideration that effective protection is only possible if the protective device assumes its protective position when the collision or the like occurs.

Figure 9:
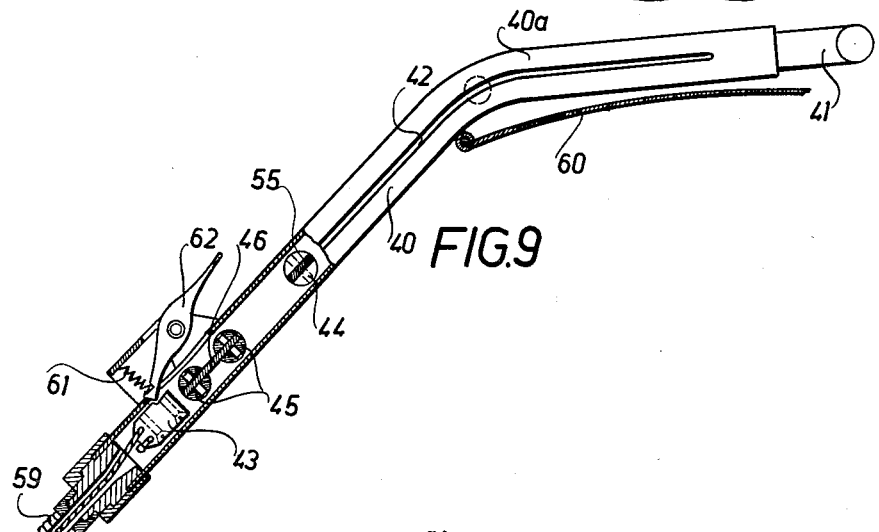
Figure 11:
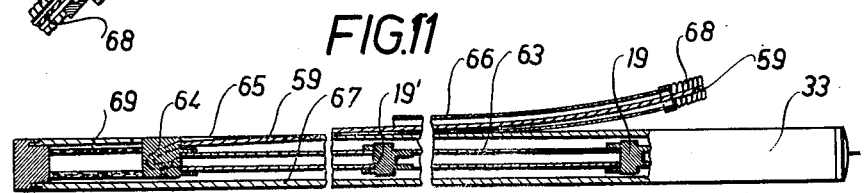

The protective device according to the invention comprises a catching member which descends before the seats at least to shoulder height of the occupants of the car in response to a sudden speed change or the like. The invention provides a catching member, which preferably consists of a resilient strap mesh, and is arranged to be thrown by means of an electrically triggered shooting device from its position of rest, in which it is collapsed together above the seats, to its extended protective position. The electric firing enables practically inertialess response of the shooting device, the use of which ensures that the protective device will move most quickly to its protective position and will assume the protective position before it is hit by the occupants of the car, who are thrown from their seats by the impact of the collision. This object cannot be achieved by other constructions. For instance, in the case of a mechanical release means the time taken for the release itself would be longer than the time within which the occupants of the car are thrown against hard parts. Nor could the desired effect be achieved with catching means pulled to the protective position by springs. Practical tests have shown that the protective device according to the invention is capable of moving the catching member to its protective position within a time of 20 milliseconds, at most. Within this extremely short time the bodies of the occupants of the car can move only extremely short distances even when the vehicle is stopped from high speeds. Moreover, door locks may be provided which are operated together with the catching member by the protective device according to the invention in order to prevent the occupants of the car from being thrown out of the vehicle in the case of a collision. Further features of the invention are apparent from the following description of the accompanying drawing in which:

FIG. 1 is a perspective view showing a protective device according to the invention installed in a passenger car. FIG. 2 is a partly sectional view showing a side strut of the device of FIG. 1. FIG. 3 is a detail view showing the lower rim fixation of a catching member of the device of FIG. 1. FIG. 4 is another detail view showing in section the arrangement of a propelling charge in a side strut. FIG. 5 is a partly sectional elevation showing door locking means. FIG. 6 shows a release contact for the firing circuit of the propelling charges. FIG. 7 shows a somewhat modified protective device of the invention installed in a passenger car. FIG. 8 is a diagrammatic front view of the protective device of FIG. 9 is a partly sectional side elevation of a side strut of the protective device of FIGS. 7 and 8. FIG. 10 is an enlarged top plan view showing the strut of FIG. 9 with the catching member suspended therein and FIG. 11 is a partly sectional view of the shooting device for actuating the protective device of FIG. 7.

Referring to the illustrative embodiment illustrated in FIGS. 1 to 6, FIG. 1 shows two tubular side struts 3 having rearwardly angled top ends 3a and disposed in the corners between the forwardly curved windshield 1 and the side walls 2 of the vehicle. A catching member 4 which is a resilient mesh of straps is guided on these side struts. In its rest position the mesh of straps 4 is collapsed at the top adjacent the bend 3b in the struts and is covered in this position by the roof lining (not shown) of the vehicle. This lining has a slot, through which the catching member can be lowered. As is apparent from the drawing the side struts 3 are provided at their lower ends with grips 5. In new cars the struts 3 may be formed integrally with the lateral frame members of the windshield holder. This construction is particularly desirable in modern vehicles having a windshield which is strongly cured forwardly. The catching member 4 consists of interconnected, preferably endless, resilient longitudinal straps 4a and transverse straps 4b. These straps themselves are preferably made of resilient plastic. Resilient eyes 6 guided on the side struts 3 are affixed to the ends of the transverse straps 4b. The upper ends of the longitudinal straps 4a are affixed to an upwardly cambered cross-member 7 which connects the two side struts 3. Winding cores 8 are provided to which the lower ends of the longitudinal straps 4a are secured. The winding cores are interconnected by two groups of transverse ropes 9, 10 (see FIG. 3). The ropes 9, 10 pass through bores in the side walls of the cores 8 with a tight fit and are anchored in the two outermost winding cores, each of which is connected to a wing nut 11, which is mounted for screw adjustment on a screw bolt 13 carried by a guide member 12. A rotation of the nut will thus result in a corresponding turning of the winding cores through the provision of the ropes 9, 10, whereby the length of the longitudinal straps 4a may be adjusted at will, i.e. the straps are either wound onto or unwound from the cores, depending on the turning direction. The downwardly directed strut portions have two diametrically opposite longitudinal slots 14, in one of which the member 12 is guided. A lug 15 integral with the guide member 12 extends outwardly through the other longitudinal slot. It has a detent 16 affixed thereto and rotatably carries a roller 17 bearing on the strut. Each of the side struts accommodates guide members, which consist in the present embodiment of a flexible shaft 18, which is somewhat smaller in outside diameter than the inside diameter of the tube, and of pistonlike end pieces 19, 20 affixed to this shaft. As is apparent from FIG. 4 the shaft 18 consists of helically wound wire the turns of which engage each other and have an interengaging profile to prevent a transverse relative displacement. Alternatively, two such tubular shafts may be arranged one in the other. The guide member 12 and the lug 15 are affixed to the end piece 20. A resilient catch 21 is provided to interengage with the detent 16 in order to hold the catching member in its protective position.

In the rest position, in which the strap mesh 4 is collapsed adjacent the bend of the struts, the guide member 18, 19, 20 is held by a locking nose 22 which engages the roller 17 and the lug 15. As is apparent from FIG. 5 this locking nose is mounted for longitudinal displacement. In the rest position a cylindrical extension 23 of the end piece 19 enters from one end into the bore of a reinforcing bushing 24, which is screwed into the tube 3a and serves as a shooting head. A cartridge case 25 filled with solid or liquid propellant is inserted into the other end of this reinforcing bushing. The propellant can be fired by means of an electrically operable detonator 26 upon closing of a circuit. The detonation will throw the guide member 18, 19, 20 out of its rest position and this member will then move the catching member 4 to its protective position. The impact of the end piece is absorbed by a rubber buffer accommodated at the lower end of the strut 3. In moving out of its rest position the lug 15 and roller 17 move the locking nose 22 to the position shown in FIG. 5. The moving nose 22 pulls a rope 27 and thereby moves a latch 28, which is a bell crank lever pivoted at 28', counterclockwise to engagement with a corresponding notch in the vehicle door 29 so as to lock the latter in the manner shown in FIG. 5. A spring 30 is provided to lock the latch 28 in both operative positions. The latch 28 will already lock the door while the catching member 4 is still on the way to its protective position. In practice it can be assumed that a time of 3 milliseconds is required to release the detonator. After further 3 milliseconds the latch 28 is in its locking position whereas the catching member takes about 20 milliseconds to reach the protective position.

The detonator 26 is mounted in a socket 32 which preferably comprises several parts fitted together so as to facilitate replacement of detonator 26. An electrical terminal pin 31 enters socket 32 and is fitted in a cap 33 which can be screwed to the reinforcing bushing 24. As socket 32 preferably comprises several parts, insulation between the socket 32 and the terminal pin 31 is easily effected. Cap 33 also comprises preferably two connected parts. The rear cap opening is preferably closed by a closure member made from insulting material. All parts are constructed to be easily removable. Current is supplied to the detonator 26 by means of the terminal pin 31, on the one hand, and on the other hand, as is usual in low-voltage systems, through ground. It may be mentioned that the pistonlike end pieces 19, 20 of the guide pieces may have longitudinal bores, grooves or the like, through which the explosion gases can escape after the detonation of the propellant.

The two electrical detonators accommodated in the struts 3 are preferably connected in parallel or series to a source of current, which may consist, e.g., of the vehicle battery. This circuit contains a release contact, which in the present embodiment as shown in FIG. 6 consists of an upright metal cylinder 34, which is electrically connected to the detonators. A resilient pin 35, which is connected to the source of current, is insulatedly mounted in this metal cylinder and is coaxial with the cylinder. The lower end of the pin 35 is gripped in an insulating bushing 36. A disc 37 is longitudinally slidably mounted in the cylindrical member 34 and arranged to be fixed in a chosen position by means of a clamping screw 37' which, when released, is slidable in an axial slot 37". This disc has an opening 38 through which the pin 35 extends. The disc 37 can be adjusted to vary the free length of the pin 35. The pin carries a weight 39. A sudden change in the speed of the vehicle or the like will cause the weight 39 to overcome the spring force of the pin 35 and to strike the cylindrical shell 34, whereby the circuit of the detonators 26 is closed. They are fired and the catching member 4 is thrown to its protective position. Owing to the vertical arrangement of the contacting device the shocks of the vehicle which occur during normal travel cannot cause the contact to be closed because these shocks of the vehicle are effective in the axial direction of the resilient pin. The free length of the pin 35 of the release device can be adjusted to determine the speed change per unit of time at which the release will be effected. The free length of the pin 35 could also be adjusted by an adjustable mounting of the weight 39 on the pin. In addition to the proposed releasing device, bumper contacts and switches which are operable by the driver may be provided for releasing the protective device. Owing to the cylindrical form of the contacting device shown in FIG. 6 the latter will respond to a shock of predetermined magnitude regardless of the direction in which the shock is applied to the vehicle.

The protective device according to FIGURES 7 through 11 differs in its construction somewhat from the device described hereinbefore. Side struts 40 are again accommodated in the corners formed inside the vehicle between the side walls of the vehicle and the windshield. These side struts are tubular and connected at the top by an integral tubular cross member 41. The side struts 40 have longitudinal slots 42 on their sides facing each other. The struts accommodate a larger guide member 43 and additional small ball-shaped guide pieces 44. The guide member 43 has two balls 45 sliding in the tube and is connected to a wing nut 48 by a connector 46, which carries a screw bolt 47. The wing nut 48 is provided with a rubber cushion 49. The wing nut 48 has groups of transverse ropes 50, 51 connected thereto, which carry winding cores 52 for the longitudinal straps 53 of the catching member in the same manner as explained in connection with FIG. 3. The catching member consists again of a strap mesh. Each of the ends of the transverse straps 54 of the mesh of straps is connected by a link 55 and a pivot pin 57 to the ball-shaped guide members 44. The links 55 have suspension eyes through which the straps 54 are threaded. Small rubber buffers 58 are also inserted in the eyes. The balls 44 are individually slidably mounted in the tube 40. In the rest position the strap mesh is collapsed at the rearwardly angled top end 40a of the side strut 40. Each of the guide members 43 is connected to a rope 59, by means of which the guide members 43 and with them the entire catching member can be pulled to the protective position from said rest position, in which the catching member is covered by the roof lining 60. In the protective position a detent 62 loaded by a spring 61 engages a notch in the guide member 43 to prevent spontaneous return of the catching member to the rest position.

A separate shooting device for each side strut is provided below the motor hood. This shooting device consists of a shooting head of the type shown in FIG. 4 and contained in a cap 33. However, the guide member 19' has connected thereto a rigid tube 63 instead of the flexible tube 18. This rigid tube 63 carries at its other end a guide member 64. This tube together with the guide members is mounted in an outer tube 67, which has a longitudinal slot 65 in which a portion of the guide member 64 moves. The rest position is shown in the right-hand half and the release position is shown in the left-hand half of FIG. 11. The guide member 64 has the rope 59 connected thereto, which extends through the slot 65, a curved tube 66, and an armored hose 68 or the like to the strut 40, and in the same as far as to the guide member 45. A common contacting device as shown in FIG. 6 is again provided for both shooting devices. Firing the propellant charges will cause the guide members 19, 64 and the tube 63 to be shot in the tube 67 from right to left as viewed in FIG. 11, until the guide member 64 strikes a buffer 69 or the like at the end of the tube. This causes the wire rope 59 which is attached to the member 64 to pull the catching member into its protective position. It will be understood that the door locking mechanism shown in FIG. 5 may be actuated by engagement of its nose 22 with the connector 46 in the same manner as described above in connection with the embodiment of the invention illustrated in FIGS. 1 to 6.

It is obvious that the embodiments of the invention shown in the drawing are only illustrative and can be modified in various respects within the scope of the attached claims. It will be understood that the protective device may be provided not only before the front seats but also before the rear seats of the vehicle. Similar devices may be used in trucks or lorries, busses, railroad passenger cars, and the like. When the protective device is mounted as shown in the drawings, care must be taken that the catching device is sufficiently spaced from the steering wheel in the protective position to prevent the downwardly moving catching straps from injuring the hands holding the steering wheel.

I claim:

1. A protective device for use in vehicles to protect the occupants thereof, which comprises in combination: guide means adapted to be mounted within a vehicle and including two spaced apart, vertically extending tubular portions, a lattice-like flexible catching member between said tubular portions and having two lateral edge portions operatively and movably connected to a respective adjacent tubular portion, said catching member being movable between a raised inoperative position and a protecting position wherein the lattice is stretched between said tubular portions, actuating means movably arranged within another tubular portion of said guide means, said catching member being normally releasably held in a raised inoperative position, means operatively connecting said actuating means to the lowermost portion of said catching member, a propellant-containing shooting device within said other tubular guide means portion, and firing means responsive to sudden change of speed of the vehicle, said firing means upon actuation causing explosion of said propellant to propel said actuating means and thus move said catching member from the raised inoperative to the protecting position.

2. A protective device as set forth in claim 1, in which said shooting device comprises a tube which is closed at one end, said propellant charge being contained in said tube and arranged to be fired by said firing means, and a portion of said actuating means being normally accommodated within said tube but being hurled out from said tube when the propellant has been fired.

3. A protective device as set forth in claim 2, in which said propellant charge comprises a cartridge filled with propellant and said firing means comprises an electric circuit including a source of current, a normally open contact arranged to be closed in response to a sudden speed change of said vehicle, and an electric detonator arranged to fire said propellant in response to closing of said circuit.

4. A protective device as set forth in claim 1, which comprises means for releasably holding said actuating means in said guide means in at least one of said inoperative and protective positions of said catching member.

5. A protective device as set forth in claim 4, in which said vertical tubular portions are formed with longitudinal slots through which the means connecting the actuating means with the catching member extend, and rearwardly angled upper portions connected to said vertical portions.

6. A protective device as set forth in claim 4, in which said shooting device comprises two shooting units each of which is arranged to act on one piston-like actuating means arranged in each tubular portion.

7. A protective device as set forth in claim 1, wherein the vehicle comprises a motor hood and said shooting device being disposed below said motor hood.

8. A protective device as set forth in claim 1, in which each of said vertical tubular portions has a rearwardly bent top portion closed by a cap removably mounted thereon, and in which each of said shooting device comprises a propellant cartridge contained in one of said caps.

9. A protective device as set forth in claim 1, in which said actuating means comprise a flexible shaft member in each of said tubular portions and slidable therein and piston-like end pieces carried by said flexible shaft members at both ends thereof.

10. A protective device as set forth in claim 1, wherein the vehicle comprises doors and locking means for said doors, means connecting the locking means to said actuating means so that movement of said actuating means to move the catching members into protective position causes simultaneous locking of said doors.

11. A protective device as set forth in claim 1, in which said catching member comprises a strap mesh consisting of longitudinal and transverse straps and which comprises a plurality of axially aligned winding cores each of which fixedly holds the lower end of one of said longitudinal straps, at least two laterally spaced parallel transverse ropes interconnecting said winding cores, two wing nuts connected to the two outermost ones of said winding cores, and screw threads formed on said means connecting the catching member to the actuating means and in threaded engagement with said nuts, whereby a rotation of said nuts will cause the ends of the longitudinal straps to be wound on and unwound from said cores and said transverse ropes to be loosened and tightened depending on the direction of said rotation.

12. A protective device as set forth in claim 1, in which said vertical tubular portions have longitudinal slots through which said means connecting the catching member and the actuating means extend and in which said catching member comprises a strap mesh consisting of longitudinal and transverse straps and which comprises additional guide members in said vertical tubular portions, and connectors guided through said slots and connecting each of said transverse straps on both ends to said additional guide members.

13. A protective device as set forth in claim 1, wherein the vehicle comprises a roof, a roof lining spaced below said roof and a windshield, said catching member in said inoperative position being disposed between said roof lining and said roof above said windshield and in said protective position substantially co-extensive with said windshield and reaching down at least to the shoulder height of the vehicle occupants, an upwardly cambered cross member carried by said vertical tubular portions, and means carried by said cross member and arranged to releasably hold the lower end of said catching member in said inoperative position.

14. A protective device as set forth in claim 13, in which said cross member and said vertical tubular portions consist of an integral bent tube.

References Cited in the file of this patent

UNITED STATES PATENTS

| | | |
|---|---|---|
| 2,477,933 | Labser | Aug. 2, 1949 |
| 2,850,291 | Ziccardi | Sept. 2, 1958 |